2,999,265
SATURATED PAD FOR CLEANSING AND
DEODORIZING
Jerome J. Duane, Westport, Conn., and Dorothy B.
Tarnoff, New York, N.Y., assignors, by mesne assignments, to Dorothy B. Tarnoff, New York, N.Y.
Filed Sept. 23, 1957, Ser. No. 685,601
4 Claims. (Cl. 15—506)

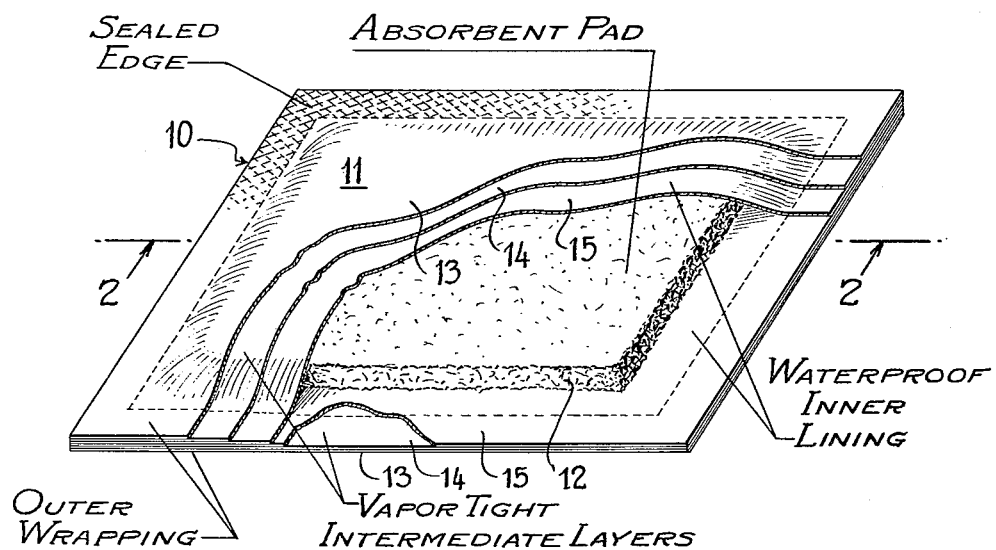
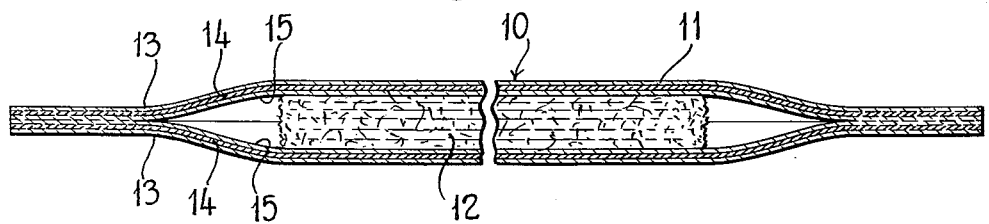

This invention relates to a product useful in feminine hygiene for cleansing and deodorizing and more particularly to a pad saturated with liquid and useful by females after eliminations to achieve a high order of personal cleanliness by removing malodorous products and detritus which remain on the body surface, while avoiding irritation of sensitive skin tissue.

Toilet tissue to cleanse the external pelvic region after urination or other elimination is irritating to the skin and frequently ineffective to obtain cleanliness. Washing with soap and water this area of the body after elimination, is frequently inconvenient, if not a practical impossibility because facilities like a bidet for so doing may not be available at the desired time or place.

It is among the objects of the present invention to provide a readily disposable pad saturated with a cleansing and deodorizing composition, hermetically sealed in a container and of a size to be carried, for example, in a lady's handbag, which pad when applied directly after removal from the hermetically-sealed container without moistening, to the female pelvic region, particularly the vulval and anal areas, gives efficient cleansing and deodorizing action and this without irritating the skin areas to which it is applied.

Other objects and advantages of this invention will be apparent from the following detailed description thereof taken in connection with the accompanying drawing which shows for illustrative purposes a preferred embodiment of the invention.

In this drawing:

FIG. 1 is a perspective view of a preferred embodiment of this invention, several of the layers forming the hermetically sealed container being broken away to show the interior structure of the container and the absorbent pad sealed therein; and FIG. 2 is a vertical section through the product of FIG. 1 taken in a plane indicated by line 2—2 on FIG. 1.

Referring to the drawing, 10 indicates a product comprising a hermetically-sealed container 11 and a pad 12 saturated with a cleansing and deodorizing composition hereinafter described, so that the pad 12 is completely dampened. The absorbent pad may contain from 2 to 6 times its dry weight of aqueous composition. In the case of an absorbent non-woven cotton pad, about 5 times its dry weight of composition usually produces an excellent product.

The hermetically-sealed container desirably is made by superimposing two laminated sheets, one above the other to form a rectangular envelope sealed on three sides leaving the fourth side open. Each laminated sheet consists of an outer protective layer 13, for example cellulose acetate or paper; an intermediate vapor-tight and opaque layer 14, e.g. metal foil such as aluminum foil; and an inner layer or lining 15 of chemically inert material, e.g. Pliofilm or Saran. Each of the layers 13, 14 and 15 are films, e.g. have an individual thickness of approximately 0.008 to 0.010 inch. Desirably, the inner layer is heat sealable, and the sheets forming the laminate are bonded together so that the sealing of the inner layers to each other forms a hermetically sealed container. Instead of forming the container by placing two laminated sheets in contact with each other as shown in FIG. 1 and heat-sealing the resultant structure along three marginal edges leaving the fourth open, a single laminated sheet may be folded along its transverse median and two marginal edges intersecting the fold line heat-sealed to form a container open along the remaining marginal edge.

In one manner of producing the hygienic product of this invention, the pad is inserted in the container through the open end, the liquid composition then introduced into the container so that it is absorbed by the pad and the open side of the container sealed to produce a hermetically-sealed container having the saturated pad therein. Alternatively, the pad may be impregnated or saturated with the composition the saturated pad inserted in the container and the open side sealed. Still another method is to place saturated pads between two sheets of laminate constructed as hereinbefore described and heat-sealing the marginal edges of the two sheets in superimposed relation to form a hermetically-sealed container with the saturated pad therein.

The absorbent pad is of non-irritating, non-linting fibrous material which disintegrates readily so that it is easily disposable. It may be either woven or non-woven, preferably the latter, because non-woven materials disintegrate more readily than woven materials. Suitable are the fabrics used for pharmaceutical or surgery purposes, such as the non-woven bleached cotton of soft flannel-like texture known as Webril (manufactured by Kendall Mills), or high quality high tensile strength absorbent paper, preferably unsized and which readily disintegrates when flushed with water. Absorbent fibrous material having a dry thickness of from about 0.025 to 0.075 inch performs satisfactorily. While it is preferred to make the pad of an approximately rectangular shape, say 3 by 5 inches in width and length, it will be understood the pad may be suitably dimensioned as desired. Also, the pads may be folded one or more times to reduce the size of the final product; such pads may be removed from the container and unfolded partially or completely for use.

The aqueous composition with which the pad is impregnated should have a pH of from 5 to 6.5, contain at least 86% by weight of water, bacteriostatic agent, and a surface active agent which will not inactivate the bacteriostatic agent and is an efficient epidermal cleanser. This aqueous composition may also contain an emollient to prevent drying out of the skin and to leave a pleasing, non-greasy softness to the skin. Preferably, but not necessarily, the composition also contains a humectant to maintain a desired degree of dampness in the saturated pad, a substance such as menthol to leave a physical sensation of coolness upon application of the saturated pad and a perfumery scent in a concentration to impart a pleasing odor upon opening of the container but not necessarily sufficient to impart any appreciable odor to the body after application of the pad. When using emulsions to impregnate the pad, the emulsions may contain a colloidal peptizing agent to stabilize same.

It is desirable to have the aqueous composition on the acid side of the neutral point. As indicated above, the pH of the composition should be within the range of from 5 to 6.5 to avoid the irritating action of alkali upon delicate skin membranes and on ordinary skin tissue in the case of soap-susceptible individuals. By excluding alkaline soap from the composition, the pH of the composition is maintained within the desired range. To insure having the pH of the composition within the range stated, small amounts of non-toxic or innocuous acidic substances such as orthophosphoric acid, citric acid, stearic acid, gluconic acid, acetic acid, lactic acid or potassium acid tartrate may be incorporated therein. By maintaining the pH within the range given above, the bacteriostatic action of the bacteriostatic agents hereinafter disclosed is enhanced as compared with their action in an alkaline environment.

The bacteriostatic agent employed is a chlorinated phenol such as any of the following or a mixture thereof:

(a) Hexachlorophene which is 2,2'-methylene bis (3,4,6-trichlorophenol)
(b) Bithionol which is 2,2'-thio bis (4,6-dichlorophenol)
(c) D.C.M.X. which is 2,4-dichloro-3,5-xylenol
(d) 2,2'-ethylidene bis (3,4,6-trichlorophenol)
(e) P.C.M.X. which is 4-chloro-3,5-xylenol.

These compounds inhibit the growth and reproduction of transient microorganisms present on skin surfaces which microorganisms are believed to be responsible for the putrefaction of certain odorous portions of normal perspiration, giving rise to noticeable body odor. They are sufficiently odorless in themselves that they do not cause the user to be aware of an objectionable "medicinal" odor when applied in accordance with the present invention. When so applied, they are absorbed or retained on the skin and hair so that the desired bacteriostatic action is maintained during the period between applications. Moreover, when applied in accordance with the present invention, they do not irritate the delicate tissue to which they are applied and are nontoxic even though absorbed through the skin surface or abrasions thereon and used repeatedly.

The concentration of these bacteriostatic agents found suitable for use in the impregnating composition is in the range of 0.1 to 2% of the weight of the composition, preferably 0.1 to 1%. Preferred range of concentrations for hexachlorophene is 0.1 to 0.4%; for bithionol it is from 0.2 to 1%. It is particularly preferred to use an amount near the upper portion of the ranges given, to avoid a possible lowering in activity of the bacteriostatic agent when the product of the invention is used to counteract odors arising from exceptionally high level of proteinaceous menses.

As the neutral surface active agent, it is preferred to employ anionic or non-ionic surface active agents which are non-irritating to the skin and will not react and thus inactivate the bacteriostatic agent. Preferred classes of anionic surface active agents are:

(1) Salts of sulfated straight chain saturated or unsaturated fatty alcohols containing from 8 to 18 carbon atoms, such as:
  (a) Sodium lauryl sulfate
  (b) Ammonium lauryl sulfate
  (c) Sodium oleyl sulfate
(2) Salts of sulfated branched chain aliphatic alcohols, such as:
  (d) The sodium sulfate of 7-methyl-undecanol-4
(3) Salts of the reaction product of fatty acyl chlorides with sarcosine, such as:
  (e) Sodium lauroyl sarcosinate
(4) Salts of the sulfated monoglycerides of straight chain saturated or unsaturated fatty acids, such as:
  (f) Sodium myristyl monoglyceryl sulfate
(5) Salts of the isethionic esters of saturated or unsaturated fatty acids, such as:
  (g) Sodium lauryl isethionate
  (h) Sodium oleyl isethionate
(6) Salts of sulfoacetic esters of saturated or unsaturated fatty alcohols, such as:
  (i) Sodium lauryl sulfoacetate
(7) Salts of polyalkyl esters of aliphatic polycarboxyl sulfonic acids, such as:
  (j) Sodium dioctyl sulfosuccinate
  (k) Sodium trihexyl sulfotricarballylate
(8) Salts of sulfated polyoxyethylene ethers of alkyl phenols, such as:
  (l) Sodium octyl phenoxyethoxyethyl ether sulfonate Examples of non-ionic surface active agents which may be used along with the anionic surface active agents hereinbefore enumerated or alone are as follows: Polyoxyethylene sorbitan monooleate, polyoxyethylene sorbitan monostearate, octyl phenoxy polyether ethanol, and nonyl phenoxy polyether ethanol.

These surface active agents when used in accordance with this invention, promote the easy removal of soil, stains, malodorous products and other detritus from the skin and hair without unnecessary rubbing. Moreover, they assist in the emulsification and stabilization of the bacteriostatic agent and emollient oils (described hereinafter), in the emulsion. Surprisingly, the combination of anionic and non-ionic surface active agents acts synergistically in that their detergency and the emulsifiability of the bacteriostatic agent and emollient oils is greater than the sum of the results of the individual surface active agents alone at the same concentration.

The concentration of surface active agent is within the range of 0.05 to 2% of the total weight of the emulsion, preferably 0.1 to 0.5% for each surface active agent used, where more than one is used. By using a mixture of nonionic and anionic surface active agents, each in amount within the range above given (0.1 to 0.5%), foaming is mitigated and any possible defatting action on the skin tissue is minimized. Moreover, by using an amount of surface active agent within this range, the amount of non-volatile residue left on the skin after application of the product of this invention is sufficiently small to be non-objectionable.

The emollient employed is a non-rancidifying fatty oil or aliphatic fatty alcohol having from 12 to 18 carbon atoms or a multisterol of lanolin or derivatives of these. Examples of such emollient are: isopropyl myristate-palmitate (Deltyl Extra), lanolin sterols (Amerchol L 101), acetylated lanolin (Modulan), acetylated distilled monoglycerides (Myvacet) and cetyl alcohol. These emollients act to prevent or relieve defatting of the skin tissue brought about by the surface active agents, to leave a pleasing non-greasy softness to the skin and give physical relief from itching.

The emollients are employed in a concentration of from 1 to 10% by weight, preferably 2 to 8% by weight based on the weight of the emulsion. Instead of the individual emollients listed above, a mixture thereof may be used, the amount of the mixture falling within the concentration range hereinabove given.

Examples of humectants which may be employed, if it is desired to incorporate same in the impregnating composition, are propylene glycol, glycerine, sorbitol and diethylene glycol. They are added to maintain a desired degree of dampness in the pad should the hermetically sealed container be opened accidentally. Propylene glycol also serves as a good solvent for the bacteriostatic agent and emollient and being water-soluble aids in emulsifying these constituents. The humectants are desirably employed within the range of 1 to 15%, preferably 2 to 12%.

Colloidal peptizing agents which can be used are: carboxymethyl cellulose, methyl cellulose, polyvinyl pyrrolidone, magnesium aluminum silicate, polyacrylic acid and amine stearates. They aid in smulsifying the water-insoluble compounds and stabilize the emulsion against separating or creaming on storage. They are used in a concentration of 0.1 to 10%, preferably 0.2 to 5% by weight. The more viscous peptizing agents are preferably used in smaller amounts within the range above given.

If methanol is incorporated, it is employed in an amount of from 0.02 to 0.5%, preferably 0.05 to 0.3% by weight. Only a fraction of a percent of a perfumery scent may be incorporated in the emulsion. The amount used should be such as to give a noticeable odor to the pad upon opening the hermetically-sealed container but not such as to remain on the skin for any great length of time after application.

The constituents of the impregnating composition may be mixed at any temperature below the boiling point of water and at or above room temperature. It is preferable to form a solution containing the bacteriostatic agent and the emollients in a suitable solvent at a temperature of from 35° to 90° C. and to this solution add a solution containing the surface active agent, peptizing agent, if used, while agitating and at approximately the same temperature. The resultant emulsion desirably is passed through a colloid mill or other means of reducing the particle size of the internal dispersed phase.

The following examples are given for purposes of illustrating the invention. It will be understood the invention is not limited to these examples. In the following examples the materials used are of high purity; the bacteriostatic agent and the emollient used are of USP grade; the water used is distilled water. All parts are given on a weight basis.

*Example I*

A solution is prepared by dissolving 0.3 part of hexachlorophene, 3 parts isopropyl myristate, 0.1 part of menthol, by warming to 40°–45° C. and then added while stirring to a mixture containing 0.5 part of magnesium aluminum silicate (Veegum), 0.2 part of polyoxy-ethylene sorbitan monooleate (Tween 80) and 25 parts of water also at 40°–45° C. After mixing for from 2 to 5 minutes, 0.2 part of lavender oil is added. The resultant emulsion is passed through a colloid mill to form a stable emulsion. This emulsion is then diluted with a solution containing 0.2 part of sodium lauryl sulfate and 70.5 parts of water. To this emulsion 0.02 part of citric acid is added so that it has a pH within the range of 5.5 to 6.0. 5 grams of this emulsion is applied to a pad of unwoven cotton fabric 3" x 5" in dimension weighing on the average 1 gram. The pad is thus completely dampened. The pad is hermetically sealed in a container of the type shown in the drawing to form the product ready for use when desired by simply opening the container.

*Example II*

5 parts of propylene glycol, 0.5 part of sodium octyl phenoxyethoxy ethyl ether sulfonate (Triton X–200), 0.5 part of Veegum and 89.0 parts of water are heated to 85° C. and then added to a mixture of 0.3 part of bithionol, 4 parts of lanolin multisterols (Amerchol L–101) and 0.5 part of stearic acid also at 85° C. This resulting suspension is agitated until the temperature falls to 45° C. and then 0.2 part of the perfumery scent is added and the mixture stirred until it reaches room temperature. The emulsion is incorporated in a pad and the saturated pad in a hermetically-sealed container as described above in connection with Example I.

*Example III*

0.3 part of hexachlorophene is dissolved in 15 parts of propylene glycol. This solution is added while stirring to a solution containing 0.5 part of methyl cellulose, 0.2 part of polyoxyethylene sorbitan monostearate (Tween 60), 84 parts of water and one drop of a floral perfumery scent. The resultant dispersion is poured on small fabric pads each weighing on the average of 2.2 grs. so that the average weight take-up of each pad is 5.6 grs. Each pad is then heat-sealed inside a container such as shown in the drawings and described above.

*Example IV*

A solution of propylene glycol containing 0.3 part of hexachlorophene, 10 parts of propylene glycol and 0.2 part of lanolin is added to a mixture of 0.3 part sodium lauryl sulfate, 0.5 part of polyvinyl pyrrolidone and 88.7 parts of water while stirring to produce an emulsion. The emulsion is employed to impregnate pads and the impregnated pads are each sealed in a container as described in the preceding examples.

*Example V*

In this example, 0.3 part of hexachlorophene is dissolved in 2.5 parts of isopropyl myristate while agitating and heating to 40° C. This solution is poured into an aqueous solution consisting of 0.5 part of Veegum, 0.05 part of sodium lauryl sulfate and 15 parts of water. The emulsion formed is passed through a colloid mill and thereafter diluted with 79.4 parts of water containing 0.2 part of sodium lauryl sulfate and 0.05 part of a lavender perfume. This emulsion is soaked into a nonwoven cotton fabric (Webril-R) and excess liquid expressed therefrom leaving a residual liquid of about 5 times the dry weight of the fabric. The damp pads are then packaged into hermetically-sealed containers of the type shown in the drawings and hereinabove described.

*Example VI*

Melt the following ingredients and heat mixture to 85° C.:

| | Parts |
|---|---|
| D.C.M.X. | 0.2 |
| Amerchol L–101 | 6.0 |
| Modulan | 2.0 |
| Stearic acid | 2.0 |
| Glyceryl monostearate | 2.0 |

Add this mixture to an aqueous solution, also at 85° C., containing 5.0 parts of propylene glycol, 0.5 part of ammonium lauryl sulfate, 0.5 part of Veegum, and 81.7 parts of water. Continue to stir until the temperature falls to 45° C., then add 0.1 part of perfumery scent and stir until room temperature is reached. Saturate the dry pads with this mixture thoroughly stirred, as in the preceding examples.

*Example VII*

Dissolve 0.15 part of 4-chloro-3,5-dimethyl phenol in a mixture of lanolin multisterol, 1.0 part cetyl alcohol, 1.0 part, and polyoxyethylene sorbitan monostearate, 0.5 part, by raising the temperature to 70° C. Add to this, while stirring vigorously, a solution of 1 part glycerin, 0.25 part sodium lauroyl isethionate in 25 parts of water, also at the same temperature. After 5 minutes add 71 parts of water at room temperature and 0.1 part of perfumery oil, and stabilize by passing this dispersion through a colloid mill. The resultant emulsion is employed to impregnate the pads and then the impregnated pads are each sealed in a container as described in the preceding examples.

*Example VIII*

A solution is made, at 85° C., of 0.25 part of hexachlorophene, 4.0 parts of lanolin multisterole, 2.0 parts of acetylated lanolin, 2.0 parts of stearic acid, 6.0 parts of neutral glyceryl monostearate, and 4.0 parts of petrolatum. To this mixture is added an aqueous solution also at 85° C. of 5.0 parts of glycerine, 0.5 part of sodium octyl phenoxyethoxyethyl ether sulfonate and 76 parts of water. The resultant emulsion is stirred until the temperature falls to 45° C., then 0.25 part of perfume are added and stirring continued until room temperature is reached. The resultant emulsion is employed to impregnate the pads and then the impregnated pads are each sealed in a container as described in the preceding examples.

The substitution of other bacteriostatic agents, emollients and surface active agents disclosed herein for these respective constituents employed in the above examples can be made; the resultant emulsions are satisfactory for use in impregnating pads.

It will be noted that the present invention provides a hygienic product in the form of a readily disposable pad saturated with a cleansing and deodorizing composition hermetically sealed and of a size to be carried, for example, in a lady's handbag. The hermetically-sealed container can readily be opened by a simple tearing operation. If desired, it may be provided with a score line which facilitates the tearing of the container to give ready access to the saturated pad therein. The pad may be applied directly as it is removed from the container without moistening it by wiping, daubing or swabbing to the skin and hair of the pelvic region and when thus applied gives efficient cleansing and deodorizing action and this without irritation. On the contrary, it leaves a pleasing, cooling physical condition and leaves so little residual liquid on the skin surface that no further drying by towel or paper is required. After use, the pad can be disposed of by flushing away or in any other sanitary manner. Thus, the present invention makes available for the first time an article specifically qualified to serve the function of the bidet fixture, so widely used throughout Europe and South America, and this in a manner which is simple, convenient, effective and inexpensive.

Our invention will be fully understood from the foregoing embodiments but it is to be understood that this invention is not restricted to the present disclosure.

What is claimed is:

1. A cleansing and deodorizing product for cleansing and deodorizing the female pelvic region comprising a readily disposable fibrous pad saturated with a liquid composition having a pH of from 5 to 6.5, said composition containing at least 86% by weight of water, from 0.1% to 2% by weight of a bacteriostatic agent and from 0.05% to 2% by weight of a surface active agent which will not inactivate the bacteriostatic agent and which composition, when applied to the female pelvic region, is not injurious thereto and will not leave any deposits thereon.

2. A cleansing and deodorizing product as defined in claim 1, in which the bacteriostatic agent is from the group consisting of hexachlorophene, bithionol, 2,4-dichloro-3,5-xylenol, 2,2'-ethylidene bis (3,4,6-trichlorophenol) and 4-chloro-3,5-xylenol.

3. A cleansing and deodorizing product as defined in claim 2, in which the surface active agent is polyoxyethylene sorbitan monolaurate.

4. A cleansing and deodorizing product for cleansing and deodorizing the female pelvic region, comprising a readily disposable fibrous pad saturated with a liquid composition having a pH of from 5 to 6.5 but containing substantially no free liquid, said composition containing about 95% by weight of water, from 0.1% to 2% by weight of bacteriostatic agent, from 0.5% to 2% by weight of a non-ionic surface active agent which will not inactivate the bacteriostatic agent, and not greater than 0.3% by weight of menthol, which composition, when applied to the female pelvic region, is not injurious thereto, does not leave any deposits thereon, and effects cleansing thereof without requiring a rinsing or drying treatment.

References Cited in the file of this patent

UNITED STATES PATENTS

| | | |
|---|---|---|
| 1,786,513 | Zuckerman | Dec. 30, 1930 |
| 2,038,957 | Reach | Apr. 28, 1936 |
| 2,400,390 | Clunan | May 14, 1946 |
| 2,415,387 | Graebner | Feb. 4, 1947 |
| 2,535,077 | Kunz et al. | Dec. 26, 1950 |
| 2,565,887 | Salfisberg | Aug. 28, 1951 |
| 2,774,709 | Mayhew et al. | Dec. 18, 1956 |

OTHER REFERENCES

Soap and Sanitary Chemicals, January 1951, pages 38–41 and 115–119.